(12) United States Patent
Losio (10) Patent No.: US 11,168,699 B2
(45) Date of Patent: Nov. 9, 2021

(54) DESTRATIFICATION FAN ASSEMBLY

(71) Applicant: I.M.E. INDUSTRIA MOTORI ELECTTRICI S.p.A., Brescia (IT)

(72) Inventor: Giambattista Losio, Brescia (IT)

(73) Assignee: I.M.E. INDUSTRIA MOTORI ELECTTRICI S.p.A., Brescia (IT)

( * ) Notice: Subject to any disclaimer, the term of this patent is extended or adjusted under 35 U.S.C. 154(b) by 92 days.

(21) Appl. No.: 16/622,334

(22) PCT Filed: Jun. 11, 2018

(86) PCT No.: PCT/IB2018/054204
§ 371 (c)(1),
(2) Date: Dec. 13, 2019

(87) PCT Pub. No.: WO2018/229627
PCT Pub. Date: Dec. 20, 2018

(65) Prior Publication Data
US 2020/0200179 A1 Jun. 25, 2020

(30) Foreign Application Priority Data
Jun. 16, 2017 (IT) .......................... 102017000067188

(51) Int. Cl.
*F04D 25/08* (2006.01)
*F04D 25/06* (2006.01)
(Continued)

(52) U.S. Cl.
CPC ......... *F04D 25/088* (2013.01); *F04D 19/002* (2013.01); *F04D 25/06* (2013.01);
(Continued)

(58) Field of Classification Search
CPC .. F04D 25/088; F04D 25/0613; F04D 29/329; F04D 29/34; F04D 19/002;
(Continued)

(56) References Cited

U.S. PATENT DOCUMENTS 4,073,598 A * 2/1978 Mizutani ............. F04D 25/0613
416/170 R
2012/0194112 A1 8/2012 Purohit
(Continued)

FOREIGN PATENT DOCUMENTS

DE 10024021 A1 1/2001
EP 2397784 A1 12/2011

OTHER PUBLICATIONS

International Search Report and Written Opinion for International Patent Application No. PCT/IB2018/054204, dated Nov. 28, 2018, 9 pages.

*Primary Examiner* — Peter J Bertheaud
(74) *Attorney, Agent, or Firm* — Armstrong Teasdale LLP (57) ABSTRACT

A destratification fan assembly of an industrial environment includes a support frame fixable to the ceiling of the industrial environment, a blade group rotatable about a main axis (X-X) and an electric motor group supporting the blade group and supported by the support frame. The electric motor group includes a drive shaft having a blade end to which the blade group is solidly connected, an electric motor operatively connected to the drive shaft to guide it in rotation, and an electronic command device of the electric motor for commanding the electric motor. In some embodiments, the electric motor includes a rotor and a stator, wherein the rotor is of the external rotor type.

12 Claims, 6 Drawing Sheets

(51) Int. Cl.
*F04D 29/043* (2006.01)
*F04D 29/34* (2006.01)
*F04D 29/64* (2006.01)
*F04D 29/32* (2006.01)
*F04D 19/00* (2006.01)
*H02K 11/33* (2016.01)
*H02K 7/14* (2006.01)
*H02K 9/06* (2006.01)
*H02K 1/27* (2006.01)
*F21V 33/00* (2006.01)

(52) U.S. Cl.
CPC ......... *F04D 25/062* (2013.01); *F04D 25/064* (2013.01); *F04D 25/0613* (2013.01); *F04D 29/043* (2013.01); *F04D 29/329* (2013.01); *F04D 29/34* (2013.01); *F04D 29/646* (2013.01); *F21V 33/0096* (2013.01); *H02K 1/2786* (2013.01); *H02K 7/14* (2013.01); *H02K 9/06* (2013.01); *H02K 11/33* (2016.01)

(58) Field of Classification Search
CPC .... F04D 25/062; F04D 29/646; F04D 25/064; H02K 7/14; H02K 11/33; H02K 1/2786; H02K 9/06; F21V 33/0096
See application file for complete search history.

(56) References Cited

U.S. PATENT DOCUMENTS

| | | |
|---|---|---|
| 2013/0015733 A1 | 1/2013 | Rasch et al. |
| 2016/0111940 A1* | 4/2016 | Oyama ............... F04D 25/0646 417/423.7 |
| 2016/0211728 A1* | 7/2016 | Yin ......................... H02K 5/04 |
| 2017/0310174 A1* | 10/2017 | Jang ........................ H02K 1/28 |

\* cited by examiner

DESTRATIFICATION FAN ASSEMBLY

CROSS-REFERENCE TO RELATED APPLICATIONS

This application is a National Stage Application of International Patent Application No. PCT/IB/2018/054204, filed Jun. 11, 2018, which claims the benefit of priority to Italian Patent Application No. 102017000067188, filed Jun. 16, 2017, the entire contents of which are hereby incorporated by reference herein.

FIELD OF THE DISCLOSURE

The present invention relates to a destratification fan assembly for an industrial environment.

In the present description, the term "industrial environment" refers to environments such as a barn or a warehouse or an open space generally extending over large areas. Specifically, these industrial environments are inhabitable both by humans and by livestock of various kinds.

The destratification fan assembly object of the present invention is specifically suitable for moving elevated air masses contained in said industrial environments in such a way as to cause a change in its state, for example in temperature, humidity, and, in some specific cases, also involve a destratification of the air mass.

In particular, the destratification fan assembly is suitable for moving said elevated air masses by performing relatively slow movements, so as to guarantee a constant movement of air in the industrial environment, avoiding, however, the formation of air vortexes.

BACKGROUND

In the prior art, destratification fan assemblies are known for these purposes.

Typically, the known destratification fan assemblies have large-sized blade groups, for example having diameters of several meters, from 2 to 6 meters, rotated by means of motor groups of various types.

In particular, embodiments are known wherein said motor groups comprise a specific electric motor, the rotation command of which is transmitted to the blade group by means of a reducer.

Also known are embodiments which have electric motor groups which, in delivering the aforesaid low speeds of rotation, operate with very low efficiency.

BRIEF DESCRIPTION

The object of the present invention is therefore to provide a destratification fan assembly which resolves said problem, preferably by minimizing the kinematic chain which drives the blade group and operating with high efficiency.

Such object is achieved by means of a destratification fan assembly according to claim 1. The dependent claims show preferred variant embodiments and further features entailing a series of new advantages.

BRIEF DESCRIPTION OF THE FIGURES

The object of the present invention will now be described in detail, with the aid of the accompanying figures, wherein.

DETAILED DESCRIPTION

Figure 1:
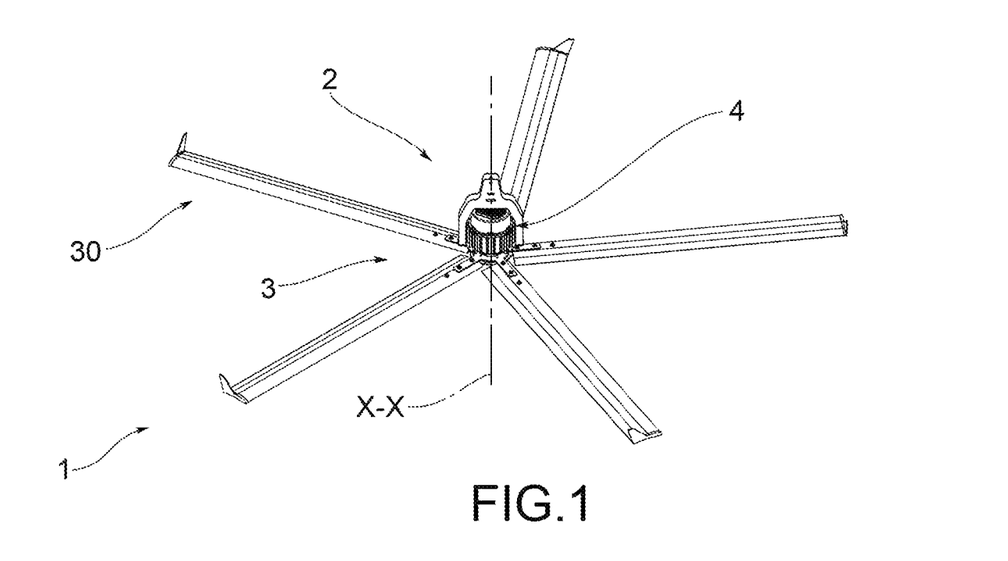
FIG. 1 shows a perspective view of the destratification fan assembly object of the present invention, according to a preferred embodiment.
Figure 2:
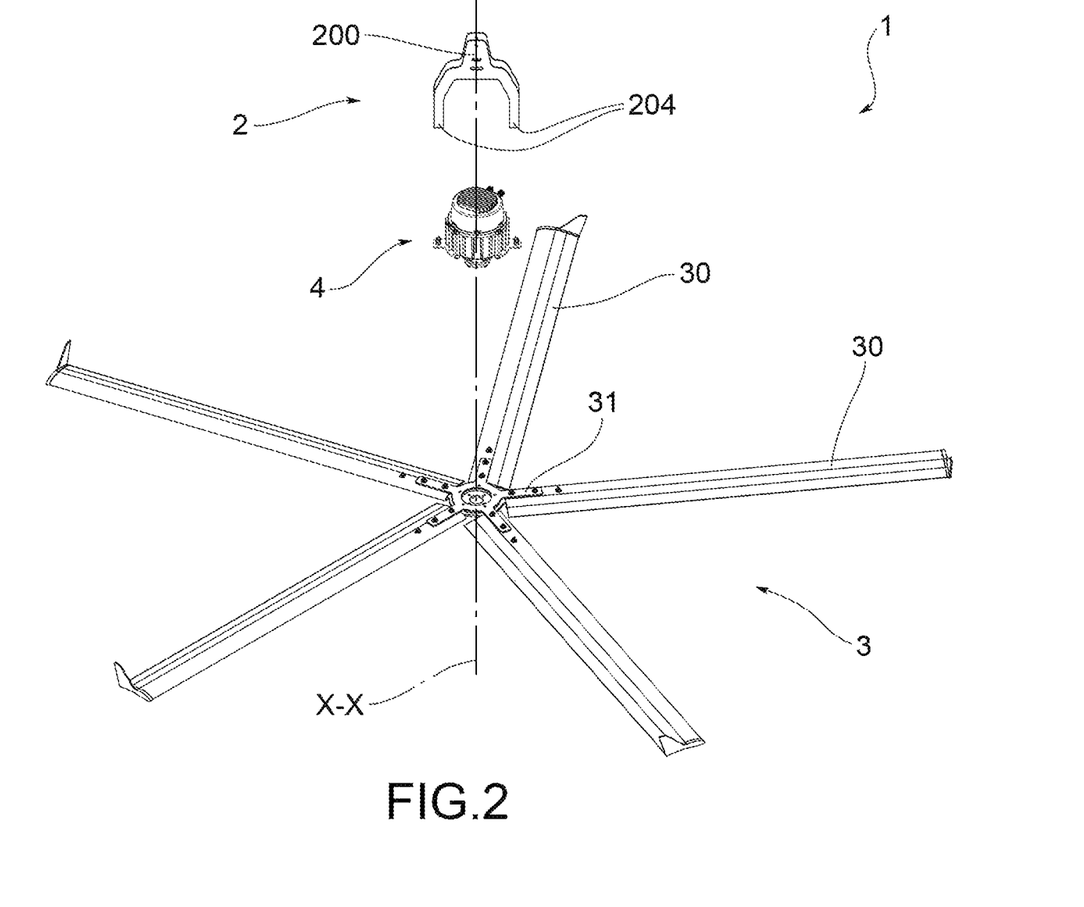
FIG. 2 shows a perspective view in separate parts of the destratification fan assembly of FIG. 1.
Figures 3A, 3B:
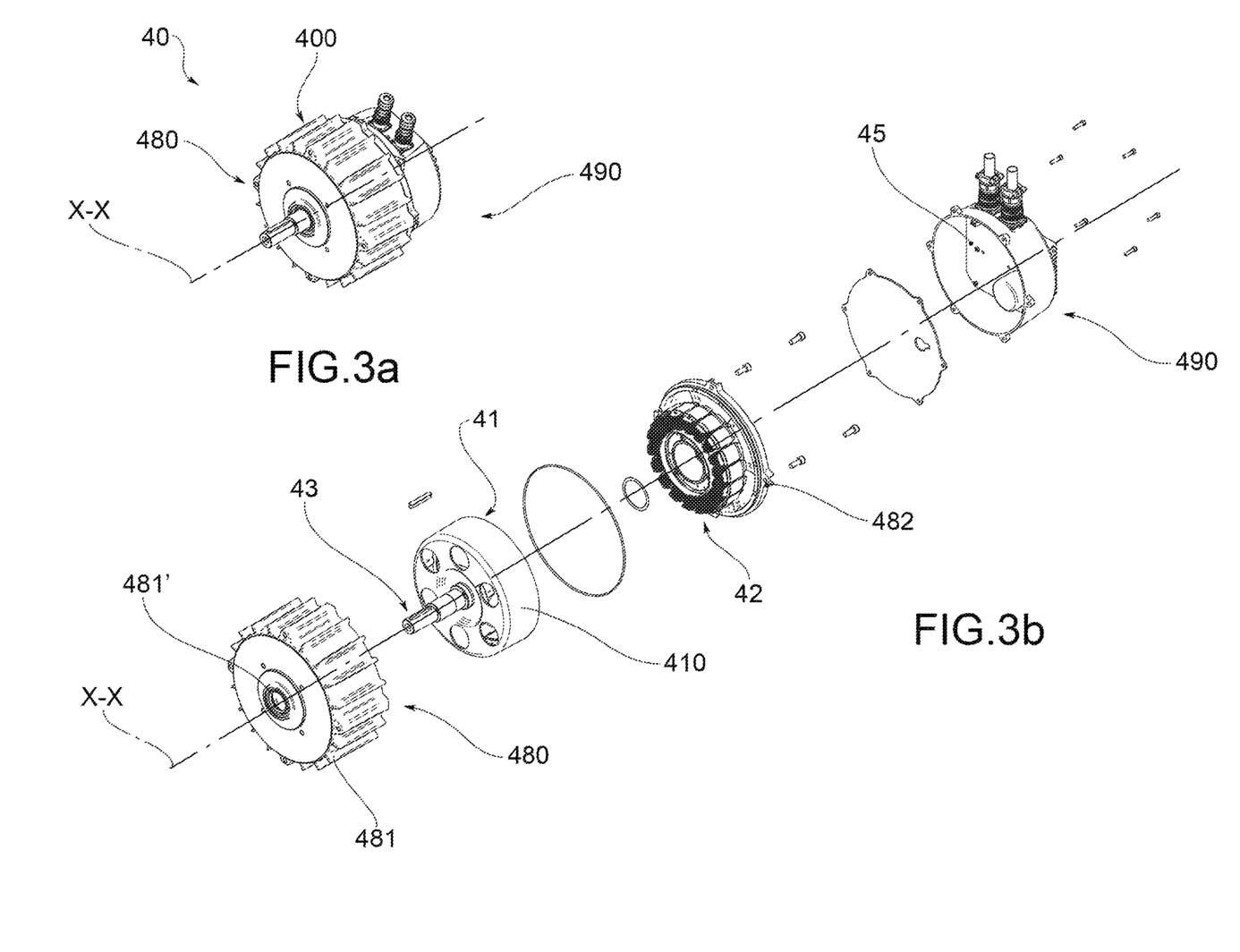
FIGS. 3a and 3b respectively represent a perspective view and a perspective view in separate parts of a motor group, according to a preferred embodiment.
Figure 4:
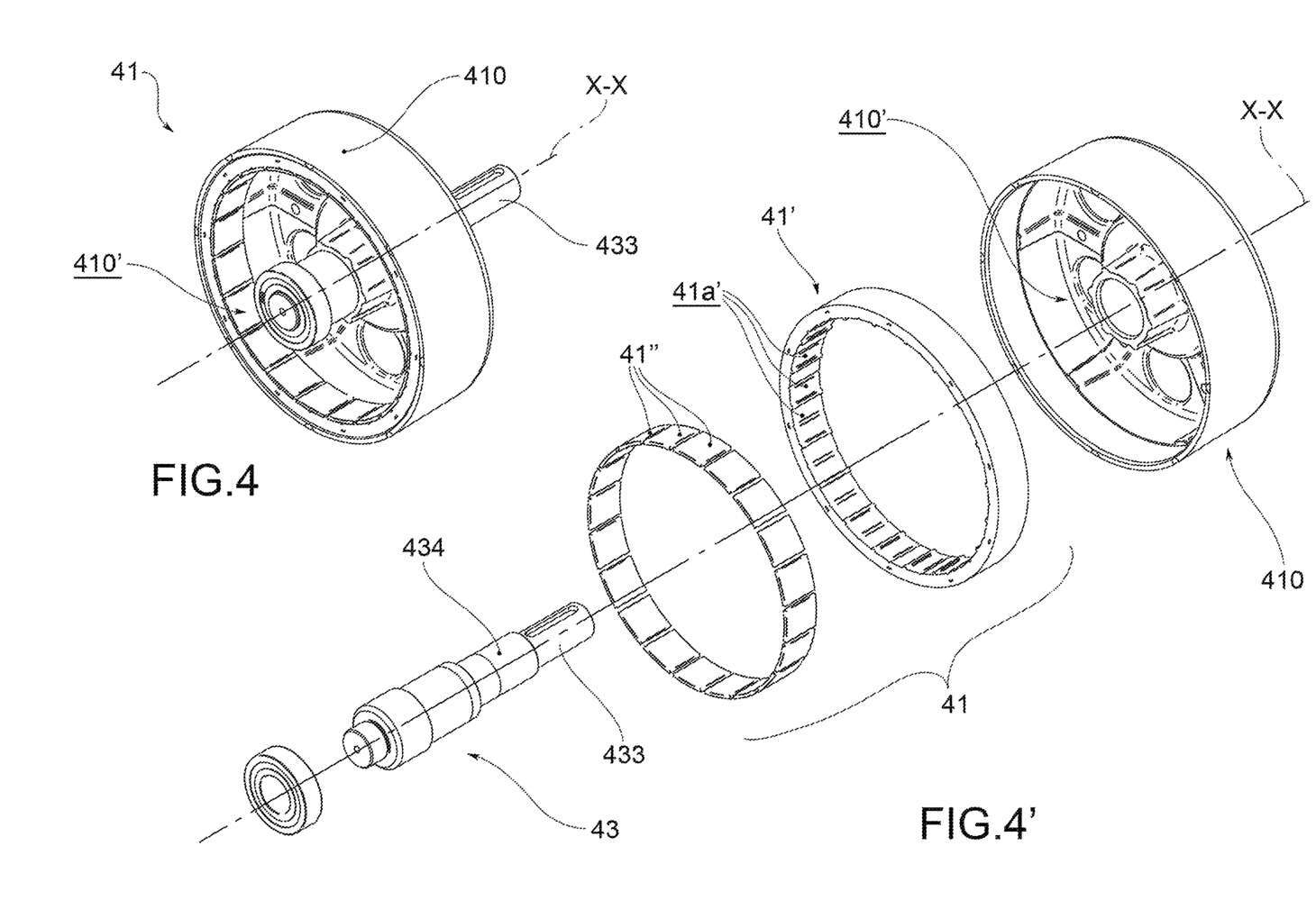
FIGS. 4 and 4' respectively represent a perspective view and a perspective view in separated parts of a rotor, according to a preferred embodiment, comprised in the motor group in FIGS. 3a and 3b.
Figure 5A:
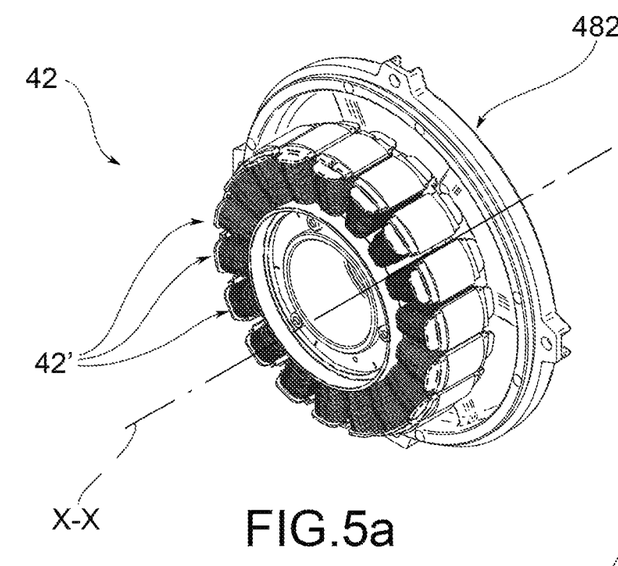
FIGS. 5a, 5a', 5b and 5b' represent perspective views and perspective views in separate parts of a stator, according to a preferred embodiment, comprised in the motor group in FIGS. 3a and 3b.
Figure 5B:
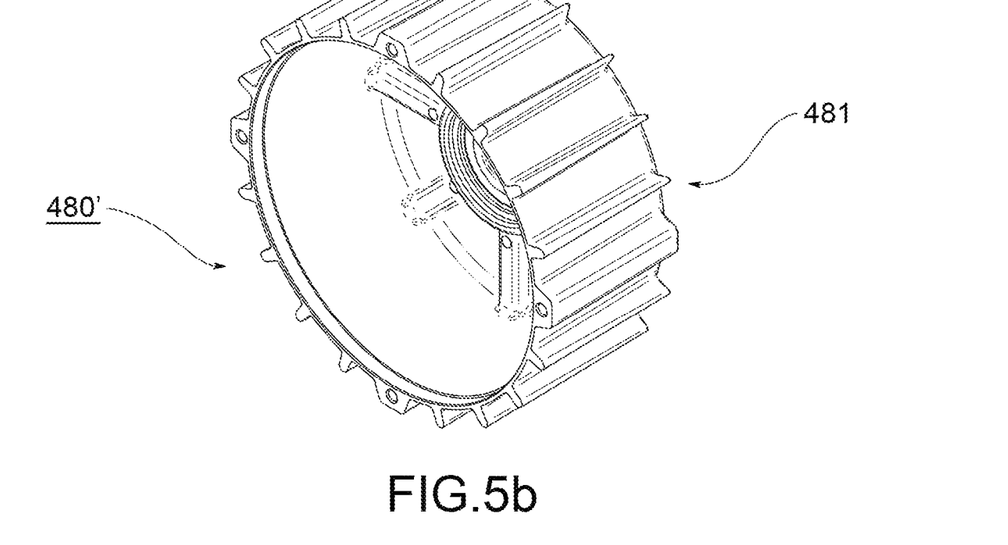
Figure 6A:
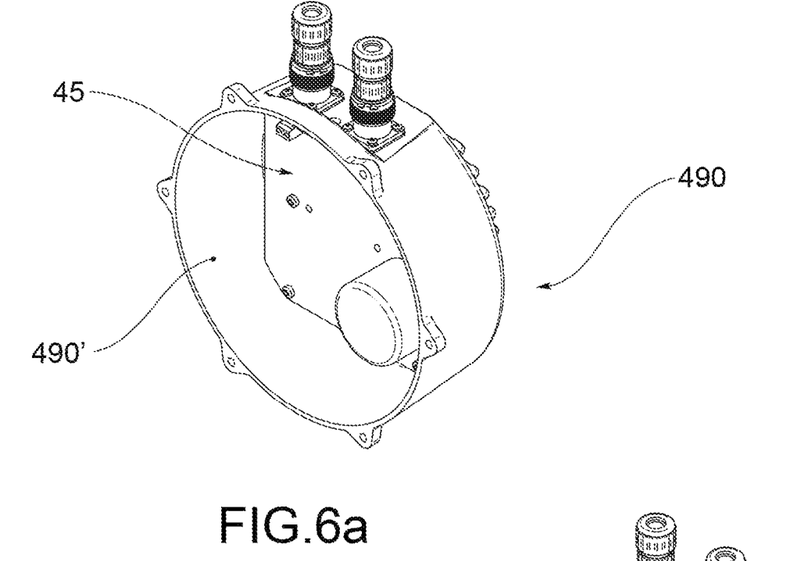
FIGS. 6a and 6a' respectively represent a perspective view and a perspective view in separated parts of a command casing and a command device, according to a preferred embodiment, comprised in the motor group of FIGS. 3a and 3b.

With reference to the aforesaid figures, a destratification fan assembly for an industrial environment is indicated in its entirety at reference number 1.

In particular, such a destratification fan assembly 1 is suitable to be mountable on the ceiling which delimits from above such industrial environments.

In particular, as described below, the destratification fan assembly 1, object of the present invention, comprises a support frame 2, fixable to the ceiling of the industrial environment, a blade group 3 and an electric motor group 4, supporting said blade group 3 and supported by said support frame 2.

According to a preferred embodiment, the support frame 2 extends in length such that, in a configuration mounted on the ceiling, the motor group 4 and the blade group 3 are spaced from said ceiling.

In particular, the support frame 2 has a support bracket having a ceiling end 200 operatively connected, preferably bracketed and bolted, to the ceiling. In addition, the support frame 2 has a support bracket having a motor end 204 operatively connected to the electric motor group 4 to support it.

According to a preferred embodiment, as shown in the attached figures, said support frame 2, i.e. the support bracket thereof, has substantially an inverted U-shape, having a central ceiling end 200 and two motor ends 204 at the two arms.

According to a preferred embodiment, as shown by way of example in the attached figures and described hereinafter, the blade group 3 is suitable to be rotated around a main axis X-X.

In a configuration with the destratification fan assembly 1 mounted to the ceiling, such main axis X-X corresponds to the vertical axis of the industrial environment. That is to say that such main axis X-X is parallel to the axis of extension of the walls of the industrial environment.

According to a preferred embodiment, said blade group 3 is commandable in rotation about the main axis X-X on command of the electric motor group 4.

According to a preferred embodiment, the blade group 3 comprises a plurality of shaped blades 30 for moving the air in a preferred axial direction. Preferably, the air is moved in an axial direction substantially parallel to the main axis X-X.

According to a preferred embodiment, the blade group 3 moves the air in a direction of aspiration. In other words, the blade group 3 moves the air towards the electric motor group 4.

According to the present invention, the electric motor group 4 extends along the main axis X-X comprising a plurality of components.

In effect, the electric motor group 4 comprises a drive shaft 43 which extends along said main axis X-X to which the blade group 3 is solidly connected. Preferably, the drive shaft 43 comprises a blade end 433 to which the blade group 3 is solidly connected, for example by positive mechanical engagement or by an axial tab, in such a manner that a rotation of the drive shaft 43 corresponds to a rotation of the blade group 3. In addition, the drive shaft 43 comprises a command portion 434, commandable in rotation.

The electric motor group 4 comprises, in effect, an electric motor 40 operatively connected to the drive shaft 43 for example in said command end 434.

According to the present invention, moreover, the electric motor group 4 also comprises an electronic command device 45 suitable for electrically commanding the electric motor 40 and commanding the rotation of the drive shaft 43.

According to a preferred embodiment, the electric motor 40 comprises a rotor 41 and a stator 42, respectively, connected to each other electrically.

Said rotor 41 is operatively connected to the motor shaft 43, for example, at its command portion 434, to command it in rotation.

According to the present invention, said rotor 41 is of the external rotor type.

Preferably, the rotor 41 extends about the main axis X-X, about the stator 42. Preferably, also the stator 42 extends about the main axis X-X preferably about the drive shaft 43.

According to a preferred embodiment, the electric motor 40 comprises a rotor bell 410 on which the rotor 41 is housed.

Preferably, said rotor bell 410 is solidly connected to the drive shaft 43; for example, the two components are mutually in positive mechanical engagement in the command portion 434 of the drive shaft 43.

According to such embodiment, a rotation of the rotor bell 410 corresponds to a rotation of the drive shaft 43.

According to a preferred embodiment, the rotor bell 410 defines a bell cavity 410' wherein the rotor 41 is housed.

Preferably, the rotor 41 comprises, in effect, an support member 41', in annular shape, and a plurality of rotor magnets 41" housed angularly spaced on said support member 41' in specially shaped rotor slots 41a'.

Preferably, the stator 42 has slot concentrated electrical windings 42'.

According to a preferred embodiment, moreover, the stator 42 comprises a cable insulation cap 420 suitable to insulate and protect the slot concentrated electrical windings 42', in particular, the electrical power contacts comprised therein.

Preferably, therefore, the slot concentrated electrical windings 42' are protected and electrically insulated from the external environment.

Preferably, the stator 42 is electrically connected to the aforementioned electronic command device 45, in such a way that the latter supplies power to the stator poles 42 and therefore commands the magnetic field which moves the rotor 41 in rotation.

According to the embodiments described above, the rotor 41 comprises twenty rotor poles (i.e. magnets) and the stator 42 comprises eighteen stator poles (i.e. pole expansions of the stator).

According to a further preferred embodiment, the electric motor 40 comprises a motor body 400 defining a motor casing 480 housing the electric motor 40 and a command casing 490 housing the electronic command device 45.

According to the preferred embodiment of the present invention, the motor casing 480 and the command casing 490 are arranged along the main axis X-X. That is to say that along the direction of the main axis X-X, the motor casing 480 and the command casing 490 are adjacent to each other.

Preferably, the motor casing 480 is comprised between the blade group 3 and the command casing 490.

According to the aforesaid preferred embodiment, the rotor bell 410 is housed in said motor casing 480. Preferably, the motor casing 480 has a through hole 481' penetrated by the drive shaft 43.

According to a preferred embodiment, the motor casing 480 comprises a first shell 481 and a second shell 482 which are sealingly engageable to each other, defining a motor chamber 480'. Said motor chamber 480' houses the electric motor 40 described above, in such a way that the blade end 433 protrudes from said motor casing 480, to be engaged by the blade group 3.

According to a preferred embodiment, the motor chamber 480' is sealed from the external environment. Preferably, the motor casing 480 in effect comprises special static and dynamic gasket elements suitable to limit actions from the external environment.

According to a preferred embodiment, the motor casing 480 comprises, on the outer surface thereof, motor blades 485 for dissipating the heat inside the motor casing 480.

According to a preferred embodiment, the motor casing 480 has a substantially axial-symmetrical extension with respect to the main axis X-X.

According to a preferred embodiment, the command casing 490 defines a command chamber 490' sealed from the external environment, wherein the electronic command device 45 is housed. Preferably, the command casing 490 is in effect provided with special gaskets suitable to prevent dirt and water (i.e. moisture) from entering the command casing 49.

According to the present invention, the electronic command device 45 comprises a command inverter which commands the AC power supply of the stator 42. In other words, the command inverter is suitable to command the power supply of the stator 42 with a sinusoidal signal current or with a trapezoidal signal current.

Innovatively, the destratification fan assembly object of the present invention presents a solution to the problem of the prior art, providing a fan assembly with a simple geometry, but above all having a high-efficiency electric motor.

Advantageously, the electric motor group has an external rotor the dimensions of which (and in particular the diameter thereof) are designable as required. Advantageously, compared to embodiments wherein the electric motor has an internal rotor, the embodiment with an external rotor has a higher torque.

An even further advantageous aspect consists in the fact that the electric motor group has particularly compact dimensions. Preferably, the motor group has an axial size on the order of 10-20 cm. Advantageously, therefore, the destratification fan assembly has the blade group in a position closer to the ceiling with respect to the known embodiments, thus being suitable to move a portion of air nearer to the ceiling. Specifically, such advantage is also achievable with rotors of large dimensions (i.e. diameter).

Moreover, advantageously, the electric motor group is in direct contact with the blade group, not having a specific supporting kinematic mechanism.

Advantageously, the destratification fan assembly is equipped with an electric motor group with compact dimensions, but with high power. Advantageously, the electric motor group has a torque maximized to the maximum thus obtaining high efficiency, on the order of 90%.

A further advantageous aspect lies in the fact that the motor group in its entirety (including the command electronics) is located in the air flow. In effect, advantageously, the electronic command device is an integral part of the electric motor and is located in the passage area of the air flow.

Advantageously, the electric motor group is completely "bathed" by the air flow; advantageously, the electric motor group is cooled by the moving air itself.

Advantageously, the containment casings of the motor components are suitable for protecting the components sealingly contained therein, preventing the entry of water (moisture) and dust. Advantageously, in this way, even delicate components such as the electronic command device have been integrated within the motor group even though this is bathed by the flow of circulating air.

Advantageously, the motor group exhibits an increase in durability during its useful life, since its components are protected from agents causing wear or malfunction.

Advantageously, due to the electronic command device, the electric motor is connectable to a power supply of 200V or 500V.

To the embodiments of the aforesaid destratification fan assembly, one skilled in the art, in order to meet specific needs, may make variations or substitutions of elements with other functionally equivalent ones.

These variants are also contained within the scope of protection as defined by the following claims.

Furthermore, each variant described as belonging to a possible embodiment may be achieved independently of the other described variants.

What is claimed is:

1. A destratification fan assembly for an industrial environment that is delimited on the top by a ceiling, wherein the destratification fan assembly comprises:
    a support frame fixable to the ceiling of the industrial environment;
    a blade group rotatable about a main axis (X-X); and
    an electric motor group extending along the main axis (X-X) supporting the blade group and supported by the support frame, the electric motor group comprising:
        i) a drive shaft extending along the main axis (X-X) having a blade end to which the blade group is solidly connected;
        ii) an electric motor operatively connected to the drive shaft, wherein the electric motor comprises:
            a motor body, defining, along the main axis (X-X), a motor casing housing the electric motor and a command casing, wherein the motor casing is positioned between the blade group and the command casing;
            a rotor wherein the rotor is operatively connected to the drive shaft, and wherein the rotor is of the external rotor type;
            a rotor bell on which the rotor is housed, wherein the drive shaft is solidly connected to the rotor bell such that a rotation of the rotor bell corresponds to a rotation of the drive shaft, and wherein the rotor bell is housed in the motor casing; and
            a stator; and
        iii) an electronic command device of the electric motor positioned along the main axis (X-X), wherein the command casing of the motor casing houses the electronic command device.

2. The destratification fan assembly according to claim 1, wherein the rotor comprises an annular support member and a plurality of rotor magnets housed angularly spaced on the support member in specially shaped rotor slots.

3. The destratification fan assembly according to claim 1, wherein the stator has slot concentrated electrical windings.

4. The destratification fan assembly according to claim 3, wherein the stator comprises a cable insulation cap suitable to insulate and protect the slot concentrated electrical windings.

5. The destratification fan assembly according to claim 1, wherein the rotor comprises eighteen rotor poles and the stator comprises twenty stator poles.

6. The destratification fan assembly according to claim 1, wherein the motor casing comprises a first shell and a second shell engagable with each other defining a sealed motor chamber.

7. The destratification fan assembly according to claim 1, wherein the command casing defines a command chamber sealed with respect to the external environment in which the electronic command device is housed.

8. The destratification fan assembly according to claim 1, wherein the electronic command device comprises a command inverter which commands a power supply of the stator with alternating current.

9. The destratification fan assembly according to claim 1, wherein the blade group comprises a plurality of shaped blades for moving the air in an axial direction parallel to the main axis (X-X).

10. The destratification fan assembly according to claim 1, wherein the support frame extends in length so that in a ceiling-mounted configuration the motor group and the blade group are spaced away from said ceiling.

11. The destratification fan assembly according to claim 4, wherein the cable insulation cap is suitable to insulate and protect electrical power contacts of the slot concentrated electrical windings.

12. The destratification fan assembly according to claim 9, wherein the plurality of shaped blades move the air in a direction of aspiration parallel to the main axis (X-X).

* * * * *